United States Patent
Yoshikawa et al.

(10) Patent No.: US 6,840,799 B2
(45) Date of Patent: Jan. 11, 2005

(54) CABLE CONNECTOR FOR CONNECTING SOLAR CELL MODULES

(75) Inventors: Hiroyuki Yoshikawa, Yokkaichi (JP); Makoto Higashikozono, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/413,363

(22) Filed: Apr. 15, 2003

(65) Prior Publication Data

US 2003/0228787 A1 Dec. 11, 2003

(30) Foreign Application Priority Data

Jun. 10, 2002 (JP) ........................................ 2002-168490

(51) Int. Cl.[7] .............................................. H01R 11/00
(52) U.S. Cl. ........................ 439/502; 439/928; 136/251
(58) Field of Search ................................ 439/502, 928; 136/251

(56) References Cited

U.S. PATENT DOCUMENTS

| | | | |
|---|---|---|---|
| 4,283,106 A | | 8/1981 | Bunnell ...................... 439/571 |
| 5,092,939 A | * | 3/1992 | Nath et al. .................. 136/251 |
| 5,119,020 A | * | 6/1992 | Massey et al. ............... 324/754 |
| 5,330,370 A | * | 7/1994 | Reddersen et al. .......... 439/502 |
| 6,075,201 A | | 6/2000 | Wambach ..................... 136/251 |
| 6,113,436 A | * | 9/2000 | Kuwahara et al. ............ 439/693 |
| 6,311,436 B1 | * | 11/2001 | Mimura et al. ............. 52/173.3 |
| 6,337,436 B1 | * | 1/2002 | Ganz ........................... 136/251 |
| 6,606,830 B2 | * | 8/2003 | Nagao et al. ............... 52/173.3 |
| 6,655,987 B2 | * | 12/2003 | Higashikozono et al. ... 439/535 |
| 2002/0028600 A1 | * | 3/2002 | Kondo ........................ 439/502 |

FOREIGN PATENT DOCUMENTS

| | | |
|---|---|---|
| JP | A 8-172210 | 7/1996 |
| JP | A 9-223538 | 8/1997 |
| JP | A 11-329549 | 11/1999 |

* cited by examiner

*Primary Examiner*—Hae Moon Hyeon

(57) ABSTRACT

A cable connector is provided that can accomplish routing of cables in a narrow space in connecting solar cell modules to each other. A plurality of solar cell modules having solar cells embedded in a building material are installed on a base board. A positive cable and a negative cable extend from the solar cell module. A first connector is connected to a an end of one cable. A second connector is connected to an end of the other cable. The first connector and the second connector have a flat outer configuration and are connected to each other, with a thickness direction of the first connector and that of the second connector substantially coincident with each other. Each of the first connector and the second connector is connected to the respective flat cable with a thickness direction of the connector substantially coincident with that of the flat cable.

9 Claims, 6 Drawing Sheets

CABLE CONNECTOR FOR CONNECTING SOLAR CELL MODULES

BACKGROUND OF THE INVENTION

1. Field of Invention

The present invention relates to a cable connector. In particular, the present invention relates to a cable connector for electrically connecting a plurality of modules, such as solar cell modules, through cables.

2. Description of Related Art

Solar-electric systems for converting sunbeams into electric energy attract favorable public attention because they do not pollute the global environment and are energy-saving. In a solar-electric system, to obtain sufficient electric power for a desired output, tens to hundreds of solar cell modules are arranged side by side, and the solar cell modules are electrically connected in series through cables. It has been common to install a large number of solar cell modules on a roof of a house after the house is built. However in recent years, to simplify assembling processes and reduce construction costs, building material-integrated solar-electric systems have become popular, in which solar cells are integrated into building materials. That is, solar cells are installed integrally with building materials such as exterior materials of a building, roof tiles, and/or the like.

FIG. 7 is a schematic view showing an example of a conventional electrical connection between a plurality of solar cell modules. As shown in FIG. 7, terminal boxes 102A, 102B, 102C, . . . for conducting electric outputs generated by photoelectric conversion are provided respectively on rear surfaces, which are opposite the light-receiving surfaces, of a plurality of solar cell modules 101A, 101B, 101C, . . . that are arranged side by side. A bypass diode and a reverse flow prevention diode are incorporated in each of the terminal boxes 102A, 102B, 102C, . . . as necessary.

Each of the terminal boxes 102A, 102B, 102C, . . . has positive and negative output terminals. Reference numerals 107A, 107B, 107C, . . . denote positive output terminals. Reference numerals 108A, 108B, 108C, . . . denote negative output terminals. Positive cables 103A, 103B, 103C, . . . extend from the positive output terminals 107A, 107B, 107C, . . . respectively. Male connectors 105A, 105B, 105C, . . . are connected to a leading end of the positive cables 103A, 103B, 103C, . . . respectively. Negative cables 104A, 104B, 104C, . . . extend from the negative output terminals 108A, 108B, 108C, . . . respectively. Female connectors 106A, 106B, 106C, . . . are connected to a leading end of the negative cables 104A, 104B, 104C, . . . respectively. As shown in FIG. 7, by connecting the female connectors 106A, 106B, 106C, . . . to the male connectors 105A, 105B, 105C, . . . respectively in the adjacent solar cell modules, the solar cell modules 101A, 101B, 101C, . . . are electrically connected in series.

SUMMARY OF THE INVENTION

In a building material-integrated solar-electric system having solar cells integrated with building materials, such as exterior materials or roofing tiles, it is necessary to route cables extending from terminal boxes within a very small space because the space of the solar cell module in a height or vertical direction is limited. When an exterior material integrated with solar cells is bonded to the surface of a wall of a building, it is necessary to route cable in a limited space between the wall surface and the exterior material.

However, as shown in FIG. 7, in a solar-electric system adopting the currently popular HCV cable as the cables 103A, 104A, . . . and using the terminal boxes 102A, . . . , the height dimension of the terminal boxes 102A, . . . is large and the outer diameter of each of the connectors 106A, . . . and 105A, . . . is large, for example, 11 mm. Therefore, it is difficult to route the cables in a small space.

In view of the above-described problem, it is an object of the present invention to provide a construction of cable connection part that can route cables in a small space in connecting solar cell modules to each other, when a building material-integrated solar-electric system is installed.

To solve the above-described problem, there is provided a cable connector for electrically connecting cables extending from a plurality of solar cell modules in series, including a first connector extending from one of the solar cell modules and connected to a leading end of a first electric output transmission flat cable having a first polarity, and a second connector extending from another one of the solar cell modules and connected to a leading end of a second electric output transmission flat cable having a second polarity opposite to the first polarity corresponding to the first connector.

In this construction, the first connector and the second connector have a flat outer configuration and are connected to respective flat cables, with a thickness direction of each connector substantially coincident with a thickness direction of the respective flat cable. The first connector and the second connector are connected to each other, with the thickness direction of the first connector and that of the second connector substantially coinciding with each other.

The first connector and the second connector may have mutually connectable housings, and mutually connectable coupling parts accommodated in the housings that electrically connect the first connector and the second connector to each other. In this construction, the coupling part of the first connector and that of the second connector may be connected to each other when the housings are connected to each other.

The first flat cable connected to the first connector and the second flat cable connected to the second connector may be directly connected to internal wiring of the solar cell module.

The first connector and the second connector may each have a cable connection part that electrically connects to the flat cable and is conductive to the coupling part, and the flat cable and the cable connection part may be made unitary by a resin-molded member.

The resin-molded member may be formed by filling a material in a die and hardening the material after the die is closed, with the flat cable and the cable connection part connected to the flat cable disposed in the die. The material of the resin-molded member may be a hot-melt resin. The solar cell module may be constructed by integrating a building material and a solar cell with each other.

These and other objects, advantages and salient features of the invention are described in or apparent from the following description of exemplary embodiments.

BRIEF DESCRIPTION OF THE DRAWINGS

Exemplary embodiments of the invention are described below with reference to the accompanying drawing, wherein like numerals represent like parts, and in which.

DETAILED DESCRIPTION OF EXEMPLARY EMBODIMENTS

Figure 1:
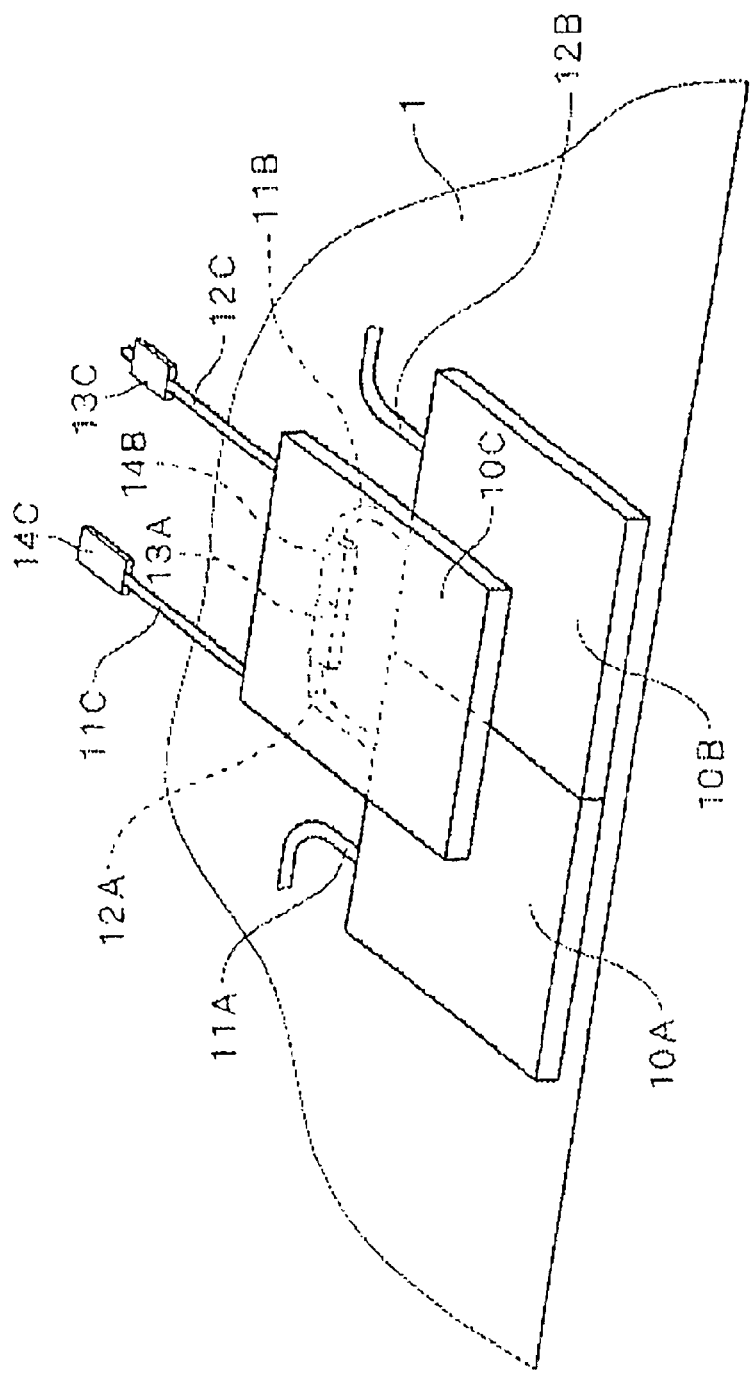
FIG. 1 is a perspective view schematically showing a part of a building material-integrated solar-electric system, such as a roofing tile-integrated solar-electric system, using a construction of a cable connection part according to an exemplary embodiment of the present invention.

FIG. 1 is a perspective view schematically showing a part of a building material-integrated solar-electric system, such as a roofing tile-integrated solar-electric system, using a construction of a cable connection part of an exemplary embodiment of the present invention. As shown in FIG. 1, roofing tile-integrated solar cell modules 10A, 10B, and 10C are disposed on a base board, such as a roof board 1 used as the foundation for laying tiles or the like on a roof. The solar cell modules 10A to 10C are constructed by embedding solar cells in building materials, such as thick roofing slates. The solar cell modules 10A to 10C can be installed in a desired pattern by a tile laying method, such as any known or later developed tile laying method.

The solar cell modules 10A, 10B, and 10C are preferably directly connected to positive cables 11A, 11B, and 11C and negative cables 12A, 13B and 12C, without the intermediary of terminal boxes. The positive cables 11A to 11C transmit positive electric outputs of the solar cell modules 10A to 10C. The negative cables 12A to 12C transmit negative electric outputs of the solar cell modules 10A to 10C. As each of the cables 11A to 11C and 12A to 12C, a flat cable or a flat wire having a thickness (height; indicated by "H1" in FIG. 6) may be adopted. The flat cable may have a wiring layer composed of a plurality of wires made of copper foil formed on a ribbon-shaped flexible resinous substrate, and a protection material covering the wiring layer. The wiring layer may be formed on the flexible resinous substrate in a two-layer construction by using ultrasonic thermo-compression bonding.

First connectors 13A, 13B, and 13C are connected to an end of the negative cables 12A, 12B, and 12C respectively. Second connectors 14A, 14B, and 14C are connected to an end of the positive cables 11A, 11B, and 11C respectively. As shown in FIG. 1, in a narrow space (narrow portion) between a rear surface of the solar cell module 10C and the roof board 1, the cable 11B and 12A are disposed between the adjacent solar cell modules 10A and 10B to electrically connect the first connector 13A and the second connector 14B in series.

Figure 2:
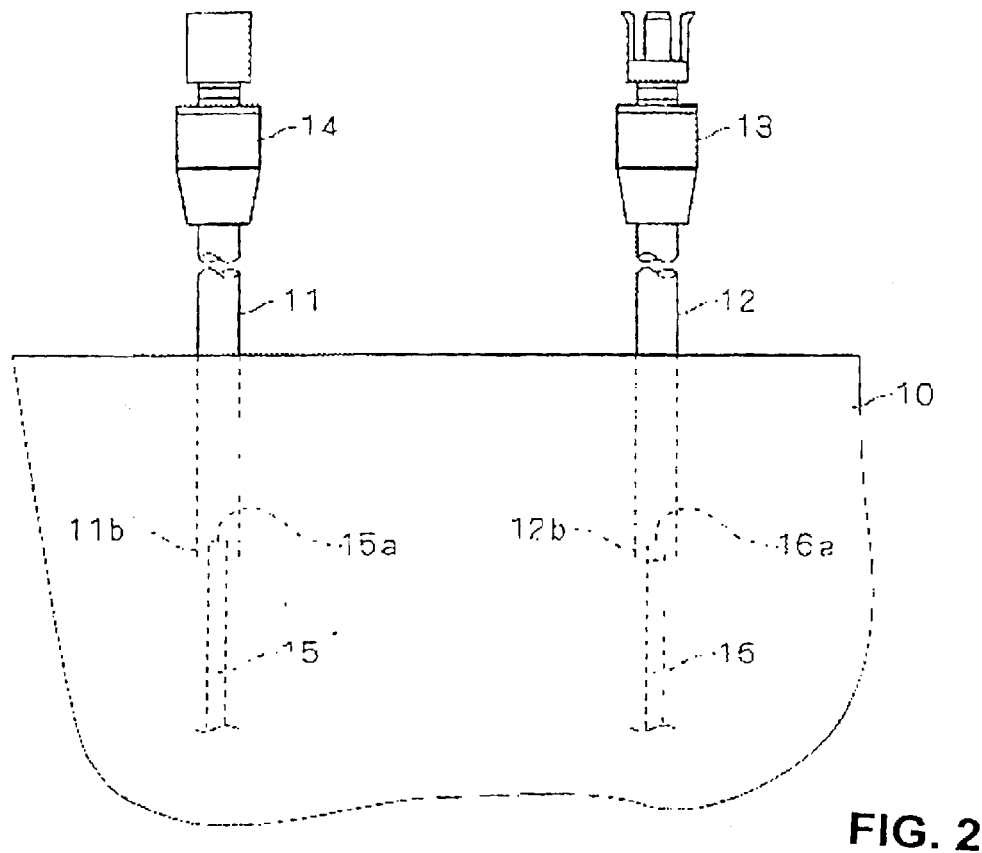
FIG. 2 is a plan view schematically showing a roofing tile-integrated solar cell module having the same construction as that of the solar cell module shown in FIG. 1.

FIG. 2 is a plan view schematically showing a roofing tile-integrated solar cell module 10 having the same construction as that shown in FIG. 1. The solar cell module 10 accommodates a positive internal wire 15 and a negative internal wire 16. A base portion 12b of the negative cable 12 is incorporated inside the solar cell module 10 and directly connected to the negative internal wire 16. Similarly, a base portion 11b of a positive cable 11 is incorporated inside the solar cell module 10 and directly connected to the positive internal wire 15.

Figure 3:
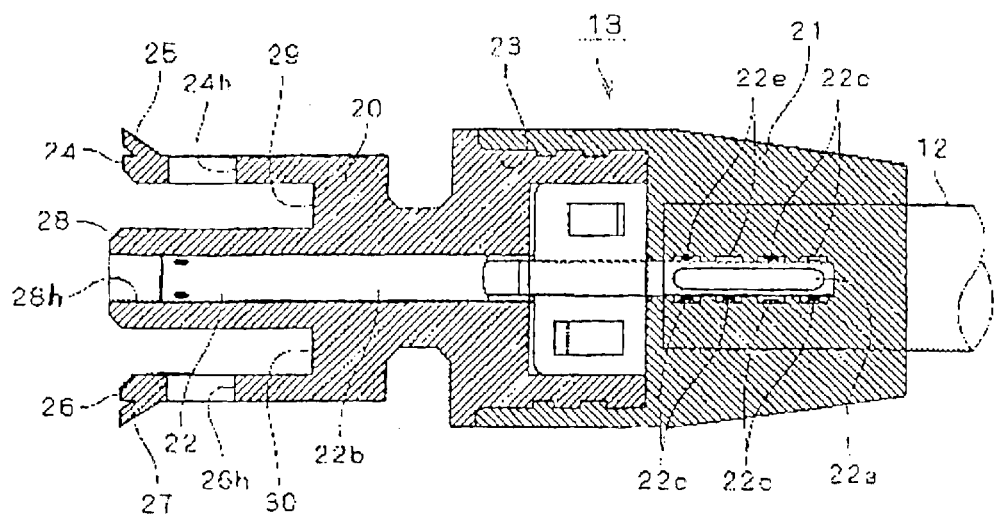
FIG. 3 is a schematic sectional view showing a first connector of an exemplary embodiment of the present invention.

A first connector 13 schematically shown in cross-section in FIG. 3 is connected to the lead-out end of the negative cable 12. A second connector 14 schematically shown in cross-section in FIG. 4 is connected to the lead-out end of the positive cable 11.

The first connector 13 and the second connector 14 each have a relatively flat outer configuration and are connected to each other with their respective thickness directions being substantially coincident with each other. In this embodiment, the first connector 13 and the second connector 14 have housings 20 and 40, respectively, whose outer configurations may be flat and which are mutually connectable. The thickness (height; indicated by "H2" in FIG. 6) of each of the housing 20 and 40 may be, for example, about 5 mm. The housings 20 and 40 are connected to the flat cables 12 and 11, respectively, with the thickness direction of the housing 20 and 40 substantially coincident with the thickness direction of the flat cables 12 and 11, respectively. Therefore, in a space (narrow portion) that is narrow in a height direction, in which the roofing tile-integrated solar cell module 10 is installed, it is possible to route the flat cables between adjacent solar cell modules.

In this embodiment, it is unnecessary to provide a terminal box on the rear surface of the solar cell module 10. The flat cable 11 and 12 are incorporated inside the solar cell module 10 and directly connected to the internal wires 15 and 16 respectively by soldering. Thus, it is possible to accomplish wiring in a very narrow portion between the adjacent solar cell modules. Because it is conventional to use an HCV cable of round cross-section and having a thickness of about 6 mm, it is difficult to incorporate the HCV cable in a thin region inside the solar cell module, unless a part of the solar cell module is thickly formed. However, because, in this embodiment, it is possible to adopt flat cables (flat wires) 11 and 12, which are thinner than the connectors 13 and 14 which may have a thickness of about 5 mm, for example, it is possible to easily incorporate the flat cables 11 and 12 inside the solar cell module without making a big design change of the solar cell module.

Figure 4:
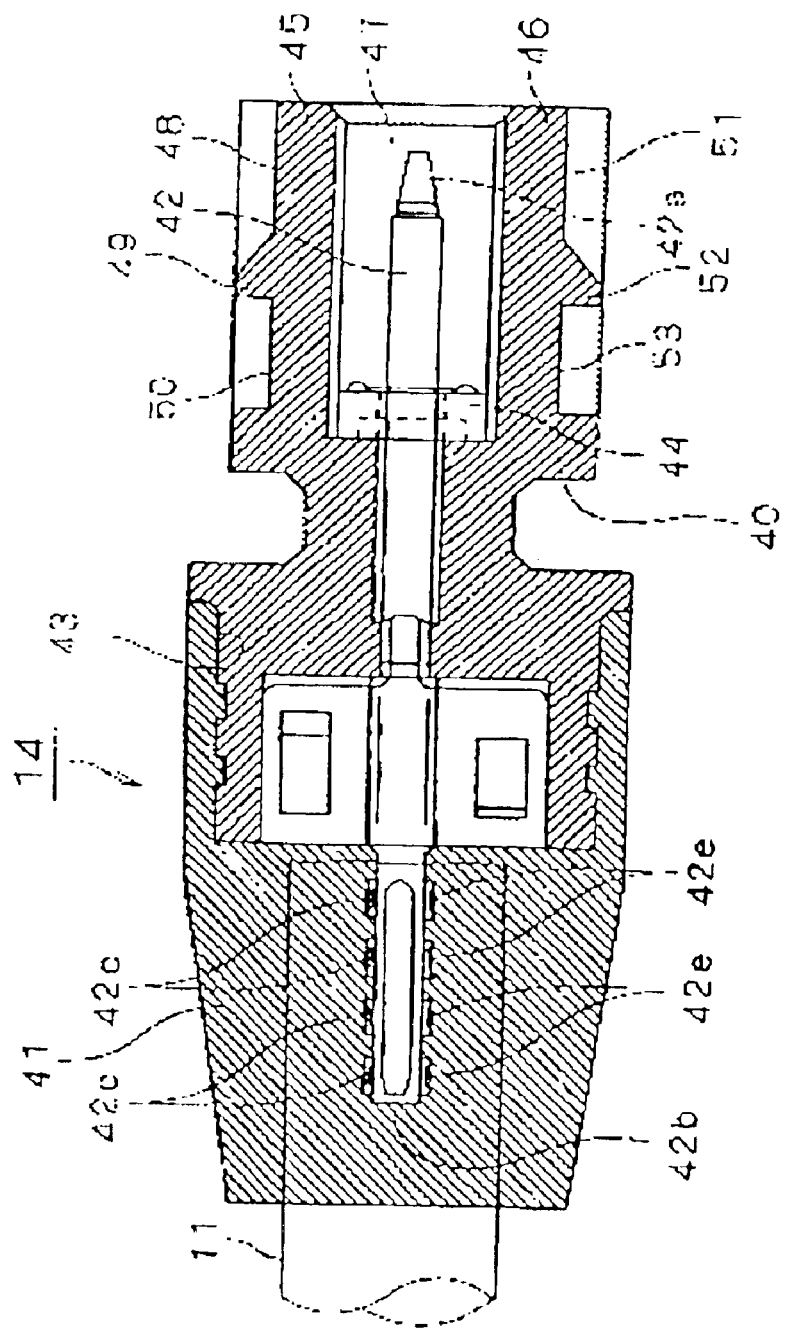
FIG. 4 is a schematic sectional view showing a second connector of an exemplary embodiment of the present invention.
Figure 5:
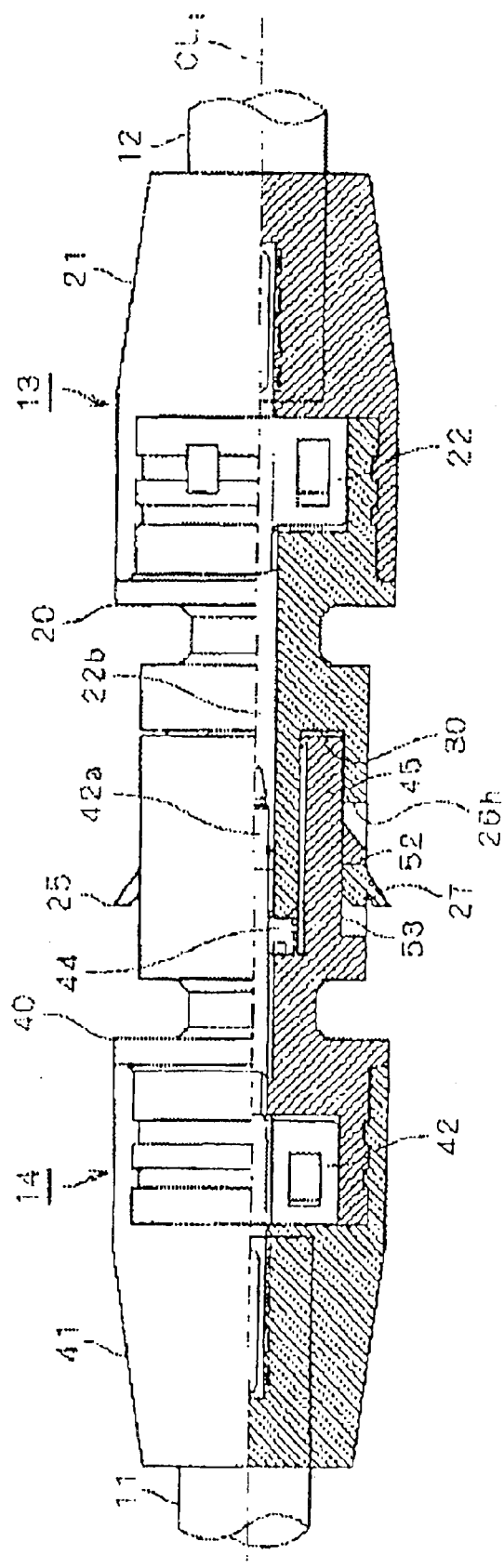
FIG. 5 is a partly cut-out plan view showing the state of connection between the first connector shown in FIG. 3 and the second connector shown in FIG. 4.
Figure 6:
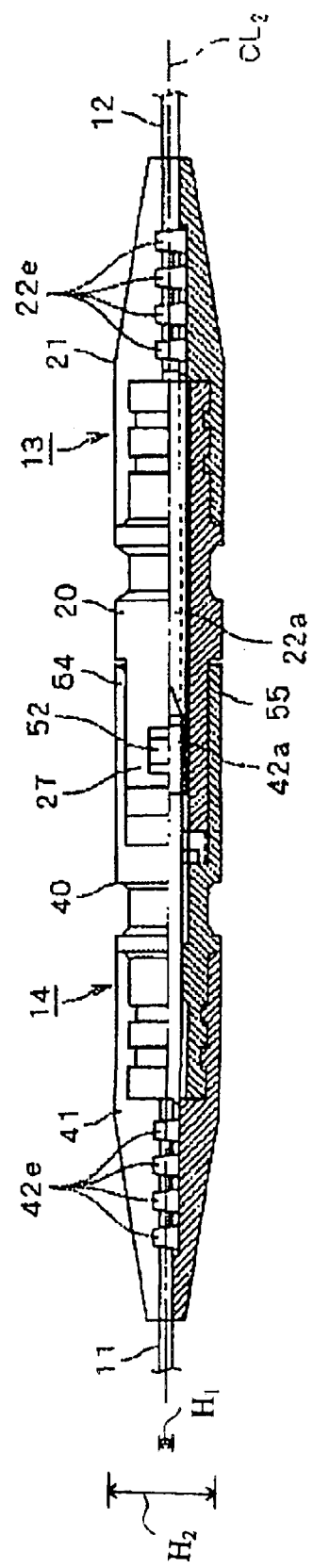
FIG. 6 is a partly cut-out side view showing the state of connection between the first and second connectors shown in FIG. 5.
Figure 7:
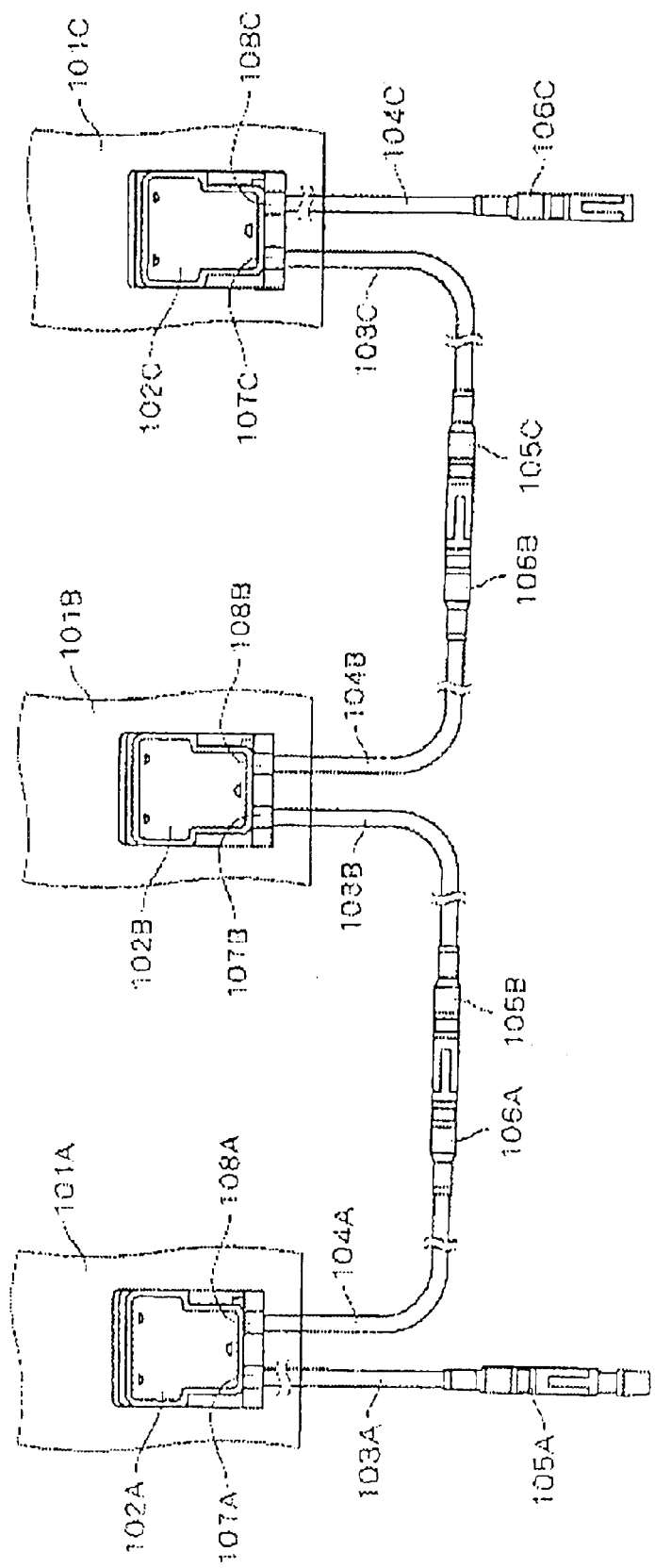
FIG. 7 is a schematic view showing an example of a conventional electrical connection between a plurality of solar cell modules.

With reference to FIGS. 3 through 6, an exemplary structure of each of the first connector 13 and the second connector 14 is described in detail below. FIG. 3 is a plan view schematically showing a section of the first connector 13. FIG. 4 is a plan view schematically showing a section of the second connector 14. FIG. 5 is a partly cut-out plan view showing a state of connection between the first connector 13 shown in FIG. 3 and the second connector 14 shown in FIG. 4. FIG. 6 is a partly cut-out side view showing a state of connection between the first connectors 13 and 14 shown in FIG. 5.

As shown in FIG. 3, the first connector 13 has a housing 20, which is a connector body, and a resin-molded member 21 covering a front end of the housing 20. The housing 20 has a cavity penetrating therethrough in a longitudinal direction and a connection terminal 22, made of metal, is inserted into the cavity and mounted in the housing 20. The connection terminal 22 is constructed of a hollow (cylindrical) female coupling part 22b, open at its rear part, and a cable connection part 22a electrically continuous with the female coupling part 22b. The cable connection part 22a is connected to the negative cable 12 and electrically continuous therewith. As shown in a side view of FIG. 6, the cable connection part 22a has a plurality of caulking portions 22e, 22e, ... extending upward from right and left side parts thereof, with the right caulking parts 22e and the left caulking parts 22e confronting each other. These caulking portions 22e, ... are caulked, with the negative cable 12 sandwiched between the right and left caulking parts 22e. Thereby the cable connection part 22a holds the negative cable 12 and is electrically continuous therewith.

The housing 20 of the first connector 13 has a shaft part 28 extending rearward along its axis and engaging pieces 24 and 26 formed at opposite sides of the shaft part 28, with concavities 29 and 30 being formed between the engaging pieces 24, 26 and the shaft part 28. A rear-end open portion 28h having an opening at its rear portion is formed inside the shaft part 28. The female coupling part 22b of the connection terminal 22 is disposed in a cavity near to the rear-end open portion 28h. The engaging pieces 24 and 26 have claw portions 25 and 27 projecting outward in a widthwise direction of the first connector 13.

The resin-molded member 21 may, for example, be formed as described below by molding using a material containing a hot-melt resin of polyamide (nylon-based) or the like as its main component. Initially a part of the cable connection part 22a may be caulked or crimped to connect the connection terminal 22 and the negative cable 12 to each other for electrical connection. Then the connection terminal 22 connected to the cable connection part 22a may be inserted into the cavity of the housing 20 to mount the connection terminal 22 on the housing 20 in a state shown in FIG. 3. After the housing 20 on which the connection terminal 22 has been mounted is disposed in a resin-molding die (not shown), the die may be closed. The material containing the hot-melt resin as its main component is heated to melt it, and injected into the die. Thereafter, the filled material and the die may be cooled to harden the material. Thereby the resin-molded member 21 as shown in FIG. 3 is formed.

As shown in FIG. 3, the resin-molded member 21 may be formed so as to bond to the entirety of a front peripheral part 23 of the housing 20, in such a way as to cover the negative cable 12 and the cable connection part 22a without forming a gap between the resin-molded member 21 and the negative cable 12. Therefore, it is possible to restrict water or dust from penetrating into the housing 20, and thereby to restrict corrosion of the connection terminal 22. The sealing performance of the first connector 13 may be so high that it can withstand outdoor environments. Because the material containing the hot-melt resin as its main component can be easily bonded to a different kind of material, high adhesive property can be obtained between the resin-molded member 21 and the negative cable 12 as well as between the resin-molded member 21 and the housing 20. Because the hot-melt resin can be injected into the die at a comparatively low pressure, the clamping construction of the die can be simplified. Therefore, the resin-molded member 21 can be injected into the die and molded at a low cost.

As shown in FIG. 4, the second connector 14 has a housing 40 which is a connector body and a resin-molded member 41 covering a rear end of the housing 40. The housing 40 may have a cavity penetrating therethrough along its axis and a connection terminal 42, made of metal, inserted into the cavity and mounted on the housing 40. The connection terminal 42 is constructed of a male coupling part 42a projecting forward and a cable connection part 42b electrically continuous with the male coupling part 42a. The cable connection part 42b is connected to the positive cable 11 and is electrically continuous therewith. As shown in FIGS. 4 and 6, the cable connection part 42b has a plurality of caulking portions 42e, 42e, ... formed at right and left side parts thereof, with the right caulking portions 42e and the left caulking portions 42e confronting each other. These caulking portions 42e, ... are caulked, with the positive cable 11 sandwiched between the right and left caulking parts 42e. Thereby the cable connection part 42a holds the positive cable 11 and is electrically continuous therewith.

A pair of locking portions 45 and 46 confronting each other on the periphery of the axis of a front-end open portion 47 having an opening in its front side is formed at a front part of the housing 40 of the second connector 14. The male coupling part 42a projects forward along a longitudinal direction of the front-end open portion 47 and is fixed to an inner wall surface of the front-end open portion 47 with a sealing member 44. Grooves 48 and 50 may be formed on an outer wall surface of the locking portion 45. A projection portion 49 may be formed between the grooves 48 and 50. Grooves 51 and 53 may be formed on an outer wall surface of the locking portion 46. A projection portion 52 may be formed between the grooves 51 and 53. As will be described later, the projection portions 49 and 52 lock into an engaging opening 24h of the engaging piece 24 and an engaging opening 26h of the engaging piece 26, respectively.

Similarly to the resin-molded member 21 shown in FIG. 3, the resin-molded member 41 may, for example, be formed as described below by molding a material containing a hot-melt resin of polyamide (nylon-based) or the like as its main component. Initially a part of the cable connection part 42b may be caulked or crimped to connect the connection terminal 42 and the positive cable 11 to each other for electrical connection. Then, the connection terminal 42 connected to the cable connection part 42b is inserted into the cavity of the housing 40 to mount the connection terminal 42 in the housing 40 in the state shown in FIG. 4. After the housing 40 on which the connection terminal 42 has been mounted is disposed in a resin-molding die (not shown), the die may be closed. The material containing the hot-melt resin as its main component may be heated to melt it, and injected into the die. Thereafter, the filled material and the die may be cooled to harden the material. Thereby the resin-molded member 41 as shown in FIG. 4 is formed.

As shown in FIG. 4, the resin-molded member 41 may be formed so as to bond the material to the entirety of a rear peripheral part 43 of the housing 40 in such a way as to cover the positive cable 11 and the cable connection part 42b without forming a gap between the resin-molded member 41 and the positive cable 11. Therefore, it is possible to restrict water or dust from penetrating into the housing 40. Therefore, the sealing performance of the second connector 14 may be so high that it can withstand outdoor environments. Since the material contains hot-melt resin as its main component, high sealing performance can be obtained. Furthermore, as described above, the resin-molded member 41 can be injected into the die and molded at a low cost.

A procedure of connecting the first connector 13 and the second connector 14 to each other will be described below with reference to FIGS. 5 and 6. The lower part with respect to a center line CL1 in FIG. 5 shows a schematic section of the first connector 13 and the second connector 14, whereas the upper part with respect to a center line CL1 in FIG. 5 shows the external appearance thereof. FIG. 6 is a side view showing the first connector 13 and the second connector 14 viewed from below. The lower part with respect to a center line CL2 in FIG. 6 shows a schematic section of the first connector 13 and the second connector 14, whereas the upper part with respect to a center line CL2 in FIG. 6 shows the external appearance thereof.

Initially the rear end of the first connector 13 shown in FIG. 3 and the front end of the second connector 14 shown in FIG. 4 are opposed to each other with the longitudinal axes thereof aligning with each other. In this state, the shaft part 28 of the first connector 13 is inserted into the front-end open portion 47 of the second connector 14 to insert the male coupling part 42a inside the front-end open portion 47 into the female coupling part 22b inside the rear-end open portion 28h of the shaft part 28. Thereby the connection terminal 22 of the first connector 13 and the connection terminal 42 of the second connector 14 are electrically connected to each other.

Simultaneously with the above operation, the locking portions 45 and 46 of the second connector 14 are inserted into the concavities 29 and 30 of the first connector 13 respectively to make the engaging openings 24h and 26h of the first connector 13 ride across the projection portions 49 and 52 respectively. Thereby the projection portions 49 and 52 are locked to the engaging openings 24h and 26h respectively. At the same time, as shown in FIG. 6, the housing 20 of the first connector 13 is fitted in engaging pieces 54 and 55 projecting forward from the housing 40 of the second connector 14. Thereby the first connector 13 and the second connector 14 are connected to each other in the state shown in FIGS. 5 and 6.

In the above description of an exemplary structure of a cable connection part of the present invention, a solar-electric system in which the roof tile serving as a building material and solar cells are integrated with each other has been exemplified. However, the present invention is also applicable to other solar-electric systems that require wiring of cables in a small space to electrically connect solar cell modules to each other.

As described above, according to the structure of cable connection part of the present invention, the first connector and the second connector are thin in the thickness direction of flat cables, and are electrically connected to respective flat cables. Therefore in a space (narrow portion) that is narrow in a height direction, in which the solar cell module is installed, it is possible to route the flat cable between the adjacent solar cell modules. The use of the flexible flat cable provides an advantage of increasing the degree of freedom in wiring.

In addition, according to this invention, the coupling part of the first connector and that of the second connector are accommodated in corresponding housings and become electrically continuous with each other when the two housings are connected to each other. Therefore, it is possible to reliably connect the coupling parts to each other and restrict exposure of the coupling parts to the open air, and thus to restrict corrosion.

Moreover, the thin flat cable can be directly connected to internal wires of the solar cell modules. Furthermore, according to the present invention, it is unnecessary to provide a solar cell module with a terminal box on its rear surface. This further contributes to making it possible to route the flat cable in a very narrow space.

According to the invention, by using a resin-molded member, flat cables can be fixed firmly to the first connector and the second connector for electrical connection.

Furthermore, by using the resin-molded member, the flat cables and the cable connection parts connected to the flat cables can be integrated with each other without forming a gap therebetween. Thus it is possible to obtain high sealing performance against water or dust.

Because hot-melt resin can be easily bonded to a different kind of material, high adhesive property can be obtained between the resin-molded member and the cable connection part of the first connector as well as the second connector, and high shielding performance can be secured. Because material containing hot-melt resin as its main component can be injected into a die at a comparatively low pressure, the clamping construction of the die can be simplified. Therefore, the cable connection part can be manufactured at a low cost.

According to this invention, it is possible to route flat cable between adjacent solar cell modules in a small space of the building material-integrated solar-electric system.

While the invention has been described in conjunction with the specific embodiments described above, many equivalent alternatives, modifications and variations may become apparent to those skilled in the art when given this disclosure. Accordingly, the preferred embodiments of the invention as set forth above are considered to be illustrative and not limiting. Various changes to the described embodiments may be made without departing from the spirit and scope of the invention.

What is claimed is:

1. A cable connection structure for electrically connecting cables extending from a plurality of solar cell modules in series in a limited space under the plurality of solar cell modules, comprising:

a first connector connected to an end of a first flat cable extending from one solar cell module of said plurality of solar cell modules, said first connector having a flat outer configuration and being connected to said first flat cable with a thickness direction of said first connector substantially coincident with a thickness direction of said first flat cable; and a second connector connected to an end of a second flat cable extending from another solar cell module of said plurality of solar cell modules, said second connector having a flat outer configuration and being connected to said second flat cable with a thickness direction of said second connector substantially coincident with a thickness direction of said second flat cable, wherein when said first connector and said second connector are connected to each other, said thickness direction of said first connector and said thickness direction of said second connector are substantially coincident with each other, and the flat outer configuration allows the first and second connectors to be routed in the limited space.

2. A cable connection structure according to claim 1, wherein said first connector includes a housing that is connectable to a housing of said second connector; and a coupling part is accommodated in each of said housings, the coupling parts electrically connecting said first connector and said second connector to each other when said housings are connected to each other.

3. A cable connection structure according to claim 1, wherein said first flat cable connected to said first connector and said second flat cable connected to said second connector are directly connected to internal wiring of respective ones of said solar cell modules.

4. A cable connection structure according to claim 1, wherein each of said first connector and said second connector has a cable connection part electrically connected to the respective one of said first and second flat cables and continuous with said coupling part; and said flat cable and said cable connection part are made unitary by a resin-molded member.

5. A cable connection structure according to claim 4, wherein said resin-molded member is an injection-molded member molded around said flat cable and said cable connection part.

6. A cable connection structure according to claim 5, wherein a material of said resin-molded member is a hot-melt resin.

7. A cable connection structure according to claim 1, wherein said solar cell modules comprise a building material integrated with solar cells.

8. A cable connection structure according to claim 1, wherein a thickness of each of said first connector and said second connector is about 5 mm.

9. A solar-electric system, comprising:
a plurality of solar cell modules, each interconnected by the cable connection structure according to claim 1.

* * * * *